United States Patent Office 3,529,158
Patented Sept. 15, 1970

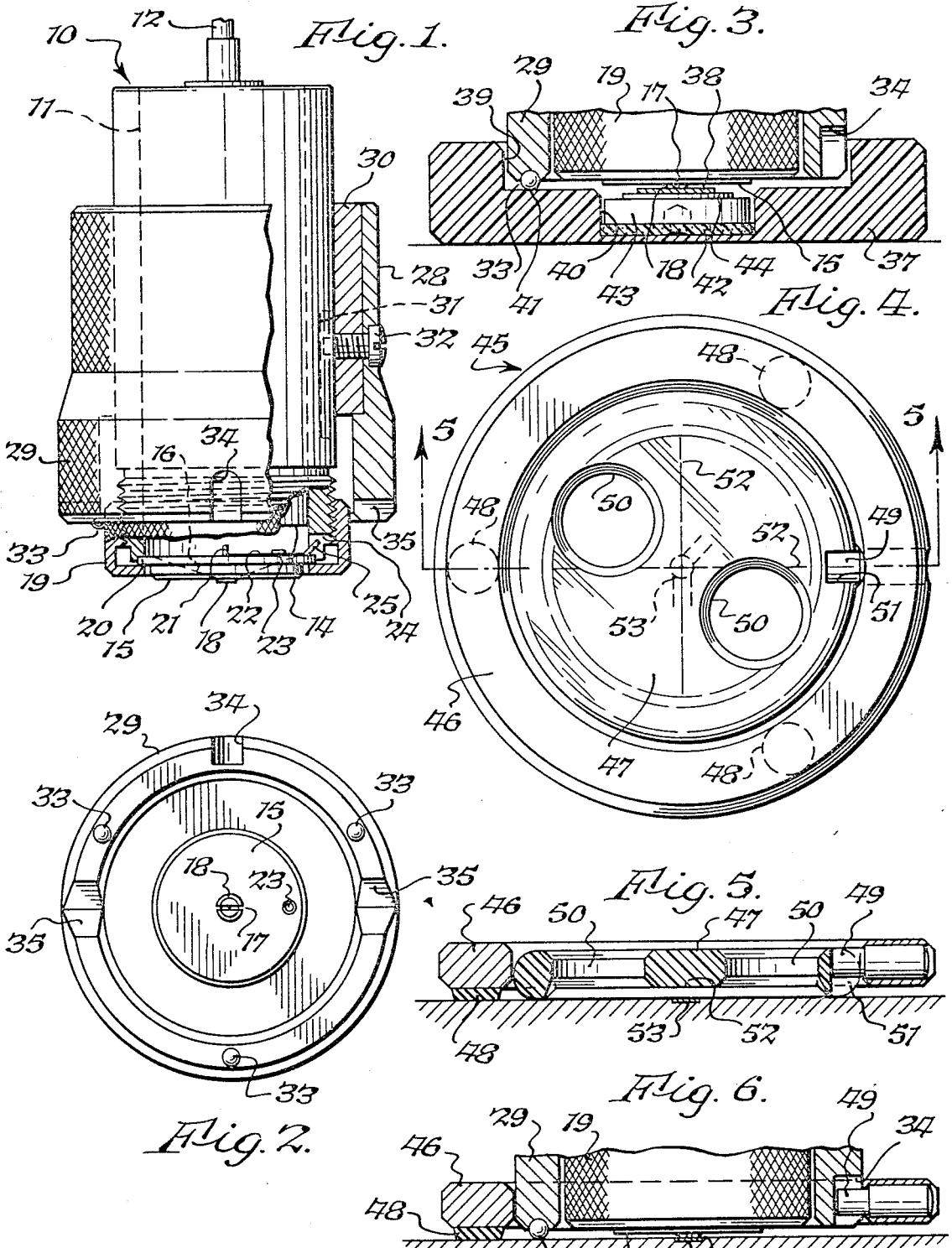

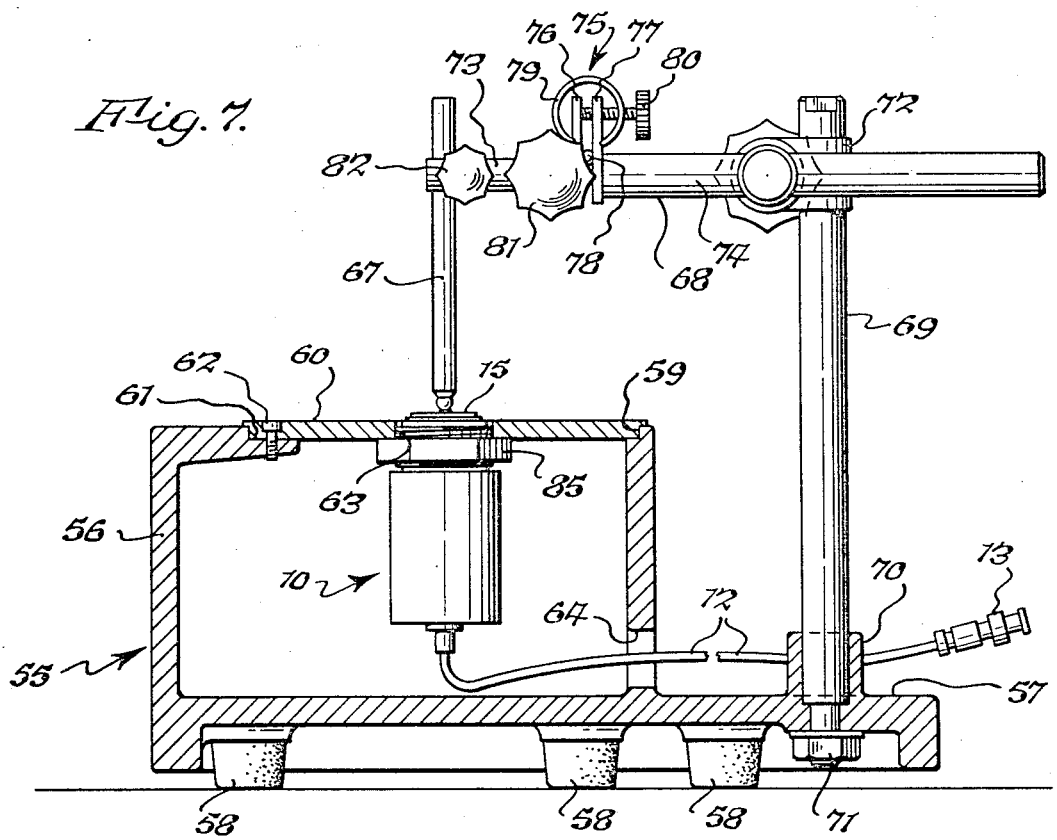
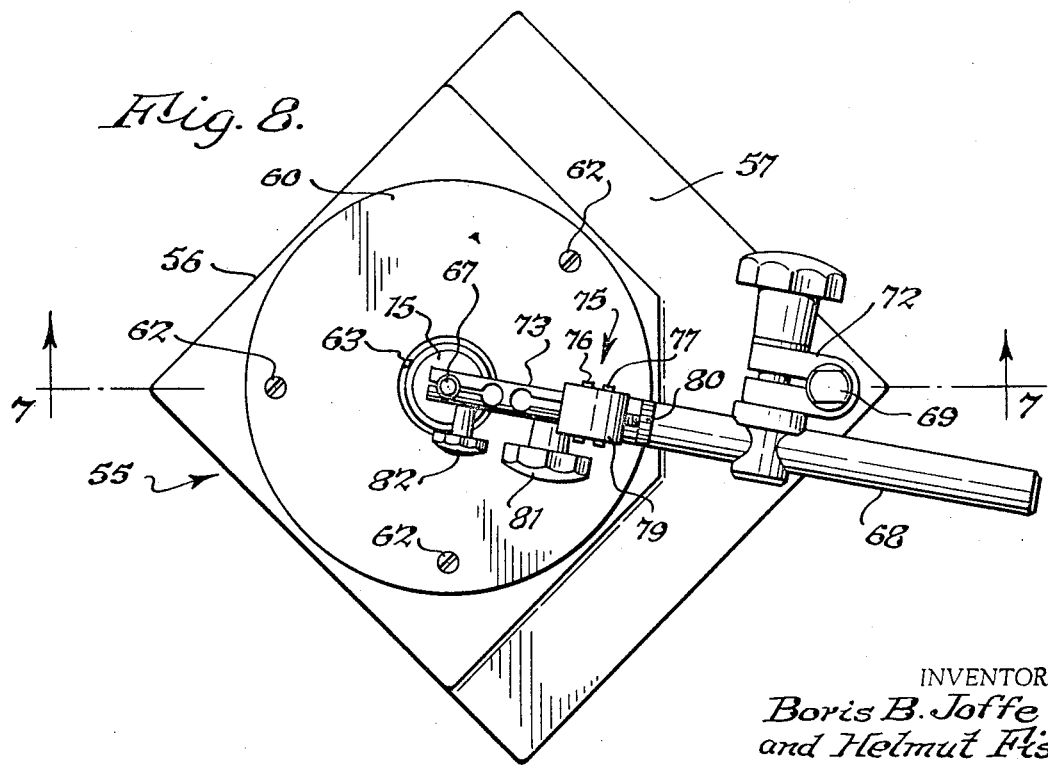

3,529,158
INTERCHANGEABLE FIXED AND PORTABLE COATING THICKNESS MEASURING APPARATUS
Boris B. Joffe, Buffalo, N.Y., and Helmut Fischer, Gechingen, Germany, assignors to Twin City Testing Corporation, Tonawanda, N.Y.
Filed Dec. 2, 1966, Ser. No. 598,696
Int. Cl. G01t *1/18;* G21f *5/02*
U.S. Cl. 250—83                             11 Claims

ABSTRACT OF THE DISCLOSURE

A portable measuring head adapted to be hand-carried and held against an object having a coating to be measured can be releasably secured to a fixed stand in position to support such an object. The head carries an object-engaging platen having an exposure aperture and which is removable for substitution of a platen having a different exposure aperture, a radiation source holder positioned to transmit radiation through the aperture and a radiation detector including a window receiving radiation backscatter through the aperture. A portable locator having a guide for positioning the locator relative to an object and a base receiving the head for alining the exposure aperture with the object also is provided. In addition, a collar telescopingly receives the head in predetermined angular orientation with the platen and has a surface engaging portion for positioning the head relative to a surface to be measured.

---

This invention relates generally to the art of measuring coating thicknesses utilizing radiation techniques. More particularly, the present invention relates to a coating thickness measuring apparatus interchangeable for use as a fixed installation and as a portable measuring probe and wherein the portable probe can be accurately positioned and stabilized relative to the area under test.

It is known that when beta rays hit a body, a certain portion of them are reflected. The intensity of the reflected beta rays is a function of the atomic number of the body. If the body is coated, the intensity of beta ray backscatter will under certain conditions, be proportional to the thickness of the coating. Therefore, such beta ray backscatter can be used to measure the thickness of coatings, and this measurement of ultra-thin coatings.

Often, the object undergoing measurement is portable and may be transported to a fixed measuring apparatus such as the measuring table disclosed in the United States Letters Patent 3,115,577 dated Dec. 24, 1963, wherein the area under test is positioned over a radiation transmititng exposure opening in the fixed table. However, where the object undergoing measurement is not portable or cannot be brought to a fixed measuring installation, for example being too large or inaccessible, the measuring apparatus must be brought to the object. Heretofore, separate and distinct measuring apparatus have been utilized for each of these measuring situations.

In each such situation, it is important that the exposure aperture abut the surface of the object under test with the latter delimiting the aperture. It is comparatively easy to meet this condition in fixed installations. However, where the measuring situation requires a portable probe, the accurate locating and stabilization of the probe in abutting relation to the object under test becomes a problem, particularly in the measurement of coating thicknesses on printed electrical circuitry and the like.

Accordingly, it is a primary object of the present invention to provide a coating thickness measuring apparatus having a measuring head selectively interchangeable for use in a fixed installation and as a portable probe.

Another object of this invention is to provide a measuring apparatus having the foregoing characteristics which is readily and easily interchanged between portable and fixed modes of operation.

It is also an object of this invention to provide a measuring apparatus as aforesaid having a locator for accurately aligning and stabilizing the portable measuring head relative to the area under test.

It is yet a further object of the present invention to provide a measuring apparatus having the foregoing characteristics wherein the portable measuring head and locator are particularly adapted for use in measuring coating thicknesses on printed electrical circuits.

In one aspect thereof, the present invention is characterized by the provision of a portable measuring head, a platen carried by the head, the platen having an exposure aperture therethrough, a radiation source holder carried by the head and positioned to transmit radiation through the aperture, a radiation detector carried by the head including a window for receiving radiation backscatter, a fixed stand arranged to support an object to be measured, and means detachably securing said portable head to the stand in measuring position relative to the object.

In another aspect thereof, the present invention is characterized by the provision of a portable radiation measuring head having an aperture, a portable locator having a base member and a guide, said guide including indicia for accurately positioning the locator over the object under test, the base member having means registering with cooperating parts on the guide and the measuring head for alining the aperture of the head in measuring position over the object under test.

The foregoing and other objects, advantages and characterizing features of the present invention are pointed out in the following detailed description of a typical embodiment thereof considered in conjunction with the accompanying drawings depicting the same wherein like numerals denote like parts throughout the various views and wherein:

FIG. 1 is a view, partly in cross section and partly in elevation, of a measuring head forming a part of the measuring apparatus of the present invention, the surrounding collar being shown in a partly retracted position for greater clarity;

FIG. 2 is a bottom plan view of the measuring head of FIG. 1;

FIG. 3 is a fragmentary cross sectional view of the measuring head illustrated in measuring position in a receptacle containing a standard for calibrating the probe in conjunction with a readout device;

FIG. 4 is a plan view of a locator for the measuring head when used as a portable probe, with a guide therein;

FIG. 5 is a cross sectional view thereof taken about on line 5—5 of FIG. 4;

FIG. 6 is a fragmentary cross sectional view of the measuring head of FIGS. 1 and 2 shown in use with the locator of FIGS. 4 and 5;

FIG. 7 is a cross sectional view of the measuring head of FIGS. 1 and 2 shown in a relatively fixed installation and taken about on line 7—7 of FIG. 8; and FIG. 8 is a plan view of the measuring apparatus shown in FIG. 7.

Referring now in detail to the illustrative embodiment of our invention depicted in the accompanying drawings, there is shown in FIG. 1 a measuring head generally designated 10, carrying a cylindrical, Geiger-Müller type radiation counter tube 11 of known construction, adapted at one end for connection via a coaxial cable 12 and plug 13 (FIG. 7) to a readout unit, not shown. Tube 11 has a window 14 at its other end opposite a platen 15. Platen 15 comprises a stepped cylindrical disk having a frusto-conically recessed inner face 16 and a central longitudinally extending aperture 17 opening into recess 16 and outwardly through a slightly raised, split circular projection 18 on the outer face of platen 15, for exposure to the area to be measured. A clamping ring 19 threads onto the end of head 10 and releasably secures platen 15 thereagainst by clamping the outer rim of platen 15 against a recessed annular shoulder 20 with the smaller diameter stepped portion of platen 15 projecting through the opening in cover 19.

A beta ray emitting source holder 21 is mounted on the end of a laterally extending arm 22 between aperture 17 and window 14, and is aligned to direct beta radiation through aperture 17. Arm 22 is secured to platen 15 as by screw 23, whereby holder 21 and its arm 22 can be removed for substitution of an arm carrying a holder containing a different isotope source. A slot 24 is formed through a side of head 10 and arm 22 has a tab 25 which projects into slot 24 whereby the angular orientation of aperture 17 is fixed relative to head 10. It will be understood that platen 15 is removable and that other platens of this general type but having conical or other configurations and/or having different aperture sizes and shapes can be substituted for platen 15 to adapt measuring head 10 for measuring coated areas of different shapes and sizes.

When measuring head 10 is utilized as a portable measuring probe, head 10 is inserted in a cylindrical collar 28 having an enlarged surface engaging support portion 29 and an inner bushing 30, the latter receiving head 10 with a close sliding fit. The side of head 10 is slotted as shown at 31 and a screw 32 threads through collar 28 into slot 31 in the manner of a key to provide limited axial movement of head 10 relative to collar 28 and restrain the same from relative rotation. Collar 28 normally falls by gravity to one or the other of its end positions as determined by engagement of screw 32 against the opposite ends of slot 31, collar 28 being shown in an intermediate position in FIG. 1 to facilitate illustration of the platen and related portions. A plurality of fixed ball bearings 33 project from the end of portion 29 to provide supporting and stabilizing feet when head 10 abuts a test surface, as shown in FIGS. 3 and 6. Support portion 29 has a slot formation thereon for purposes as will presently appear.

A pair of diametrically opposed V-shaped grooves 35 are formed in the end of support portion 29 with one of the grooves being in axial alignment with screw 32. Slots 24 and 31 are also in axial alignment whereby when head 10 is inserted in collar 28 and used as a portable probe, V-grooves 35 and longitudinally extending aperture 17 will be in diametrical alignment as seen in FIG. 2 for purposes hereinafter described. Grooves 35 adapt collar 28 for use of the probe on cylindrical as well as flat surfaces.

A receptable 37 (FIG. 3) is provided for preliminary determination of the backscatter count for a base material, indicated at 38 identical to the base material of the coated test area, or for any desired calibrating standard. Receptacle 37 has a pair of cylindrical stepped recesses 39 and 40, outer recess 39 being adapted to receive head portion 30 with bearings 33 engaging shoulder 41. Inner recess 40 has a sponge pad 42 glued to its base for cushioning a disk 43 having a plate 44 on which base material 38 is placed. Thus head 10 can be placed in receptacle 37 with aperture 17 directly abutting base material 38 and the latter delimiting the area of aperture 17 whereby an accurate preliminary backscatter count can be attained.

It is a feature of this invention that there is provided a locator (FIGS. 4–6), generally indicated 45, for accurately positioning aperture 17 of probe 10 directly over a test area. Locator 45 comprises a heavy, preferably metal base member in the form of, annulus 46 and a circular, transparent guide 47 adapted to fit within annulus 46. Annulus 46 has a plurality of rubber supporting feet 48 on its underside, and an inwardly projecting radial lug 49. Guide 47 has a pair of finger holes 50 passing therethrough and a radial slot 51 opening through its periphery to receive lug 49 when guide 47 is placed within annulus 46.

A pair of intersecting cross hairs 52 are formed on guide 47, to comprise a reticle, when guide 47 is placed within annulus 46, cross hairs 52 can be aligned with the object under test, for example a line 53 of a printed circuit (FIGS. 5 and 6), by joint movement of annulus 46 and guide 47. With cross hairs 52 thus aligned with line 53, guide 47 can be removed from annulus 46 without moving the latter, by inserting fingers into holes 50 and withdrawing guide 47 from annulus 46. Head portion 30 of measuring head 10 then is placed within annulus 46 with lug 49 registering in slot 34 (FIG. 6). In this manner, aperture 17 is accurately aligned directly over line 53 and placed in abutting relation to the area being measured, with probe 10 stabilized thereagainst and maintained in an upright position by supporting feet 33.

Referring to FIGS. 7 and 8 which depict measuring head 10 disposed in a fixed installation, there is provided a table or stand generally indicated 55 and having a box-like housing 56 surmounting a platform 57, the latter having a plurality of depending feet 58. Housing 56 has a circular opening 59 through its upper face and plate 60 secured in opening 59 against a shoulder 61 therearound by a plurality of screws 62. Plate 60 has a central opening 63 threaded to receieve the externally threaded end portion of head 10, ring 19 having been removed. Housing 56 has a lateral opening 64 and with plate 60 removed, head 10 can be threaded in opening 63 and cable 12 and plug 13 inserted through opening 64 whereupon plate 60 can be secured to housing 56 by screws 62 to provide a fixed support for measuring head 10. A lock ring 85 is used to secure head 10 to plate 60 from below.

To hold objects such as ball bearing 65 in measuring position on a platen 15 having a circular aperture, a holder generally designated 66 is provided. Holder 66 comprises a holder stem 67 which bears against the top of ball bearing 65 and is vertically adjustable in one end of an articulated holder arm 68 which extends across the top of housing 56 and is mounted on a mounting stem 69. The lower end of stem 69 slip-fits into and has a shoulder abutting the base of a nipple 70 on platform 57 with stem 69 being secured thereto by nut 71. A clamp 72 rotatably carries arm 68 and can be loosened to raise and lower arm 68 on stem 69 to fix the same in vertically adjusted position. Holder arms of different construction than arm 68 can of course be used with the apparatus of this invention.

Arm 68 is divided into two segments 73 and 74 joined end to end by an adjustable clamp 75. Clamp 75 includes plates 76 and 77 secured on the adjacent ends of segments 73 and 74 with plates 76 and 77 spaced and pivoted to one another by bearings 78 and a spring 79. A knob 80 having a threaded shank passes through spring 79 and threads through end plate 77 to abut end plate 76 to provide a fine pivotal adjustment about bearings 78 of segment 73 relative to segment 74. The ends of segment 73 are bifurcated and the threaded shank portion of a knob 81 pivotally clamps the bifurcated inner end of segment 73 to end plate 76 to provide a coarse pivotal adjustment of segment 73 relative to segment 74. Stem 67 is adjustably mounted to segment 73 by the threaded shank of knob 82 which releasably clamps the bifurcated outer end of arm segment 73 about stem 67. Holder 65 is thus universally adjustable and accordingly adapted to hold a wide variety of objects in abutting relation relative to the platen 15 carried by head 10.

In use, when the measuring apparatus herein described is to be used as a portable measuring probe, plate 60 is removed from housing 56 by removing screws 62 and head 10 is unthreaded from plate 60. Lock nut 85 is removed, and cable 12 and plug 13 withdrawn through opening 64 to free the measuring head from the measuring table of the fixed installation. Head 10 then is inserted through collar 28, and screw 32 engaged in slot 31 to align the longitudinal extending aperture 17 of the selected platen 15 with V-grooves 35, the measuring head 10 being now ready for use as a portable probe. A platen 15 carrying a source 21 and having an aperture size and shape particularly adapted to the measurement at hand, for example line 63 of a printed circuit, is selected and clamped to head 10 by threading clamp ring 19 thereon.

The preliminary backscatter count for a sample base material 38, corresponding to the base material of the coated object under test, is taken. When the probe and readout unit are calibrated, the measuring head 10 is positioned against the test area. The probe can be hand held against the coating area being measured. Where the area under test is horizontal, the probe is self-supporting. If precise locating is desired, locator 45 can be used. In the case of a printed circuit, for example, having a specific coated area 53, locator 45 is placed on the circuit board with cross hairs 52 of guide 47 aligned with area 53 thus locating lug 49. Guide 47 is removed from annulus 46 and collar 29 of the measuring probe is positioned within annulus 46 with lug 49 registering in slot formation 34. In this manner, aperture 17 is aligned with and abuts against area 53.

For use on cylindrical surfaces, V grooves 35 align aperture 17 with the axis of the cylinder, the prove being stabilized by hand.

When not in use as a portable probe, measuring head 10 can be re-installed in table 56 by removing clamp ring 19, collar 28 and platen 15 from head 10, removing plate 60 from housing 56 and threading lock unit 85 on head 10 which then is threaded into plate 60. Cable 12 and plug 13 are inserted through opening 64 and plate 60 fastened to housing 56 by screws 62. Measuring head 10 is now ready for use in its fixed installation and objects can be brought to stand 56 for measurement and held in place against aperture 17 by holder 66. It will be appreciated that table 56 can be moved about from one supporting surface to another and that the term "fixed" therefore is used in a relative sense, denoting a stand to which the test specimen is brought, whereas the portable probe is brought to the specimen under test.

It is apparent that the objects of this invention have been fulfilled. The present construction provides a measuring head which is readily and easily interchanged for use in a fixed installation or as a portable probe. Moreover, the accuracy of the measuring head when used as a portable probe is, in many applications, greatly increased by the use of the locator and guide.

While only beta radiation has been specifically referred to herein, it will be appreciated that the apparatus of this invention also has utility with gamma and other forms of nuclear radiation.

Having thus described and illustrated a preferred form of our invention, it will be understood that such description and illustration is by way of example only and that such modifications and changes as may suggest themselves to those skilled in the art are intended to fall within the scope of the present invention which is limited only by the appended claims.

What we claim is:

1. Apparatus for measuring coating thicknesses utilizing nuclear radiation techniques and adapted for alternative use as a fixed installation and as a portable measuring probe comprising a portable measuring head adapted to be hand-carried and held against an object having a coating to be measured, an object engaging platen carried by said head, means releasably securing said platen in position on said head, said platen having an exposure aperture therethrough, a radiation source holder carried by said head and positioned to transmit radiation through said aperture to an object engaged by said platen, a radiation detector carried by said head including a window for receiving radiation backscatter through said aperture, a fixed stand having a flat upper surface and means providing an opening through said surface, and means releasably securing said portable head to said stand in position to support an object having a coating to be measured, said head being releasably secured in said opening with said platen facing upwardly to receive and support an object in measuring position over said aperture.

2. Apparatus according to claim 1, wherein said flat upper surface is provided by a plate containing said opening, said head being threaded into said opening, and lock nut means carried by said head and engaging the undersurface of said plate to releasably secure said head in place thereon.

3. Apparatus according to claim 1, wherein said means releasably securing said platen in position on said head comprises a clamping ring, and said means releasably securing said head to said stand comprises lock nut means carried by said head and engaging said plate, said ring being removed when said head is secured to said stand.

4. Apparatus according to claim 1, wherein said platen is removable for substitution of a platen having a different exposure aperture and is releasably secured in place on a head by said clamping ring.

5. Apparatus according to claim 4, wherein said radiation source is carried by said platen, said source being removable from said platen for substitution of a different isotope source.

6. Apparatus according to claim 4, together with coacting means on said head and on said platen maintaining a predetermined relative angular orientation therebetween.

7. Measuring apparatus adapted for use in conjunction with the measurement of coating thicknesses utilizing nuclear radiation techniques comprising a portable radiation measuring head having an exposure aperture, a portable locator having a base member and a guide, said guide including indicia for accurately positioning said locator over an object under test, said base member having means registering with cooperating parts on said guide and on said measuring head for alining said exposure aperture in measuring position relative to the object under test.

8. Measuring apparatus according to claim 7, wherein said base member has an opening therethrough, said guide being removably positioned within said base member opening, said head being positioned within said opening with said guide removed therefrom when measuring an object under test.

9. Measuring apparatus according to claim 8, wherein said guide includes a transparent member having finger grip means to facilitate removal thereof from said base member, said indicia including cross hairs on said guide.

10. Apparatus for measuring coating thicknesses utilizing nuclear radiation techniques comprising a portable measuring head adapted to be held against a surface to be measured, an object engaging platen having an exposure opening therethrough, means mounting said platen on said head for removal and replacement by another platen having a different exposure opening, a radiation source holder mounted on said head in position to direct radiation through said opening against a surface being measured, a radiation detector carried by said head in position to receive radiation backscatter through said opening, a collar telescopingly receiving said head, and means maintaining a predetermined angular orientation between said collar and said platen.

11. Apparatus as set forth in claim 10, wherein said collar has a surface engaging portion for positioning said head relative to a surface to be measured, and aligning indicia on said collar portion.

References Cited

UNITED STATES PATENTS

| 3,399,303 | 8/1968 | Berk. |
| 2,964,631 | 12/1960 | Foster. |
| 3,115,577 | 12/1963 | Joffe et al. |

ARCHIE R. BORCHELT, Primary Examiner

U.S. Cl. X.R.

250—105, 106